United States Patent
Hsu

(10) Patent No.: US 9,671,316 B2
(45) Date of Patent: Jun. 6, 2017

(54) TESTING SYSTEM OF EXERCISE MACHINE AND METHOD OF REMOTELY TESTING EXERCISE MACHINE

(71) Applicant: GEE HOO FITEC CORP., New Taipei (TW)

(72) Inventor: Ching-Lu Hsu, Taipei (TW)

(73) Assignee: GEE HOO FITEC CORPORATION, New Taipei (TW)

( * ) Notice: Subject to any disclaimer, the term of this patent is extended or adjusted under 35 U.S.C. 154(b) by 610 days.

(21) Appl. No.: 14/191,694

(22) Filed: Feb. 27, 2014

(65) Prior Publication Data
US 2015/0241314 A1 Aug. 27, 2015

(51) Int. Cl.
G01M 99/00 (2011.01)
G07C 3/00 (2006.01)
A63B 22/02 (2006.01)
A63B 22/06 (2006.01)

(52) U.S. Cl.
CPC ............ *G01M 99/005* (2013.01); *G07C 3/00* (2013.01); *A63B 22/0235* (2013.01); *A63B 22/0605* (2013.01); *A63B 22/0664* (2013.01); *A63B 2220/30* (2013.01); *A63B 2225/02* (2013.01); *A63B 2225/10* (2013.01); *A63B 2225/305* (2013.01); *A63B 2225/50* (2013.01)

(58) Field of Classification Search
None
See application file for complete search history.

(56) References Cited

U.S. PATENT DOCUMENTS

| | | | | |
|---|---|---|---|---|
| 4,840,372 A | * | 6/1989 | Oglesby | A63B 24/00 482/4 |
| 7,621,846 B2 | * | 11/2009 | Ainsworth | A63B 24/00 482/1 |
| 2007/0033069 A1 | * | 2/2007 | Rao | A63B 24/00 705/2 |
| 2012/0323518 A1 | * | 12/2012 | Lechtenberg | G06Q 10/20 702/108 |

* cited by examiner

*Primary Examiner* — Alexander Satanovsky
*Assistant Examiner* — John Kuan
(74) *Attorney, Agent, or Firm* — Ming Chow; Sinorica, LLC

(57) ABSTRACT

A testing system of exercise machine includes a control signal source and an exercise machine. The control signal source includes a remote control device saved with a plurality of testing commands. The exercise machine includes a control unit and a plurality of driving units. The control unit includes a first controller received in a control panel of the exercise machine, and the first controller generates an error code corresponding to one of the driving unit when the exercise machine malfunctions. The testing commands respectively correspond to different error codes. The remote control device sends an acquiring command to the first controller to obtain the generated error code, and sends the testing command which corresponds to the error code to the first controller to test the corresponding driving unit, and a testing result is sent back to the control signal source. Whereby, the efficiency of testing could be improved.

14 Claims, 5 Drawing Sheets

TESTING SYSTEM OF EXERCISE MACHINE AND METHOD OF REMOTELY TESTING EXERCISE MACHINE

BACKGROUND OF THE INVENTION

1. Technical Field

The present invention relates generally to an exercise machine, and more particularly, to a testing system of an exercise machine and a method of remotely testing the exercise machine.

2. Description of Related Art

Lacking of exercise has become a typical problem for people in the modern world. Since exercising is well known to be good for cardiopulmonary function and blood circulation, which effectively lowers the chances of suffering from chronic diseases, many people start using exercise machines to exercise indoors. Therefore, there are more and more gyms or workout clubs established in cities.

When a conventional exercise machine malfunctions, it displays an error code to indicate the approximate parts which went wrong, and the error code can be seen as a rough instruction for maintenance. However, the error code usually is not specific enough, and it still takes awhile to narrow down where the problem is. Furthermore, there are usually a lot of exercise machines in a gym or workout club, which requires pretty large labor cost to maintain all of them. Therefore, the conventional method of testing exercise machines is not perfect, and still can be improved.

BRIEF SUMMARY OF THE INVENTION

In view of the above, the primary objective of the present invention is to provide a testing system and a testing method for an exercise machine, which provides a high efficiency of testing.

The present invention provides a testing system, includes an exercise machine and a control signal source; the exercise machine includes a control unit and a plurality of driving units electrically connected to the control unit, and the driving units are driven by the control unit, wherein when any one of the driving units malfunctions, the control unit generates an error code specifically corresponding to the malfunctioning driving unit; the control signal source is connected to the control unit of the exercise machine, wherein the control signal source is saved with a plurality of testing commands, each of which respectively corresponds to each of the error codes; wherein when any one of the driving units malfunctions, the control unit generates the corresponding error code; the control signal source sends an acquiring command to the control unit to obtain the error code, and then sends the testing command which corresponds to the error code to the control unit; after receiving the testing command, the control unit tests the driving unit which corresponds to the error code, and sends a testing result back to the control signal source.

The present invention further provides a method of testing at least an exercise machine, wherein the exercise machine has a control unit and a plurality of driving units to be driven by the control unit; when any one of the driving units malfunctions, the control unit generates an error code specifically corresponding to the malfunctioning driving unit; the method comprising the steps of: A. sending an acquiring command from a remote control device to the control unit of the exercise machine, wherein the remote control device is saved with a plurality of testing commands, each of which respectively corresponds to each of the error codes; B. transmitting the error code generated by the control unit to the remote control device if there is one of the driving units malfunctioning; C. sending the testing command which corresponds to the error code from the remote control device to the control unit of the exercise machine; and D. testing the driving unit which corresponds to the error code according to the testing command, and then sending a testing result back to the remote control device.

Whereby, the present invention sends the acquiring command and the testing commands to the exercise machine actively, and therefore when the exercise machine malfunctions, further testing could be proceeded, and the testing result could be sent back, which improves the efficiency of testing the exercise machine.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

The detailed description and technical contents of the present invention will be explained with reference to the accompanying drawings. However, the drawings are for illustration only and cannot be used to limit the present invention.

Figure 1:
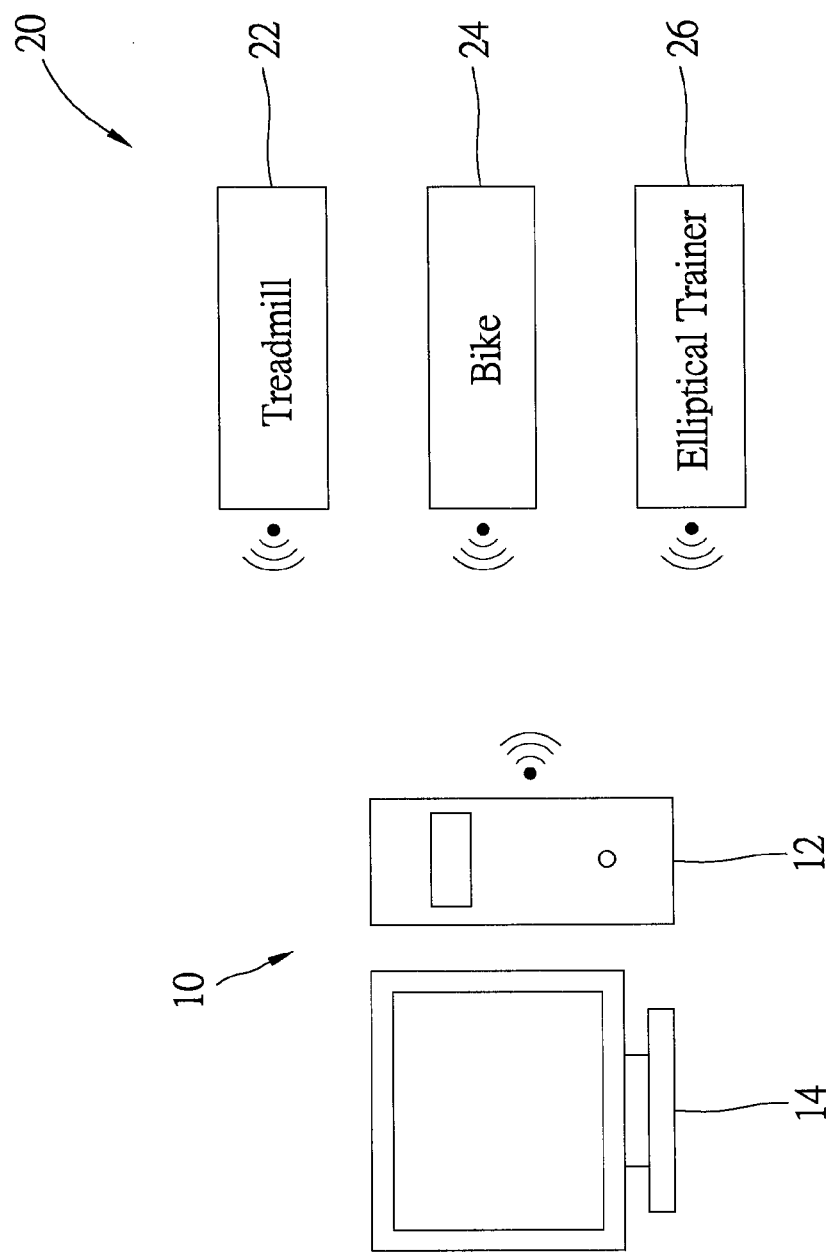
FIG. 1 is a block diagram of the testing system of a first preferred embodiment of the present invention.
Figure 2:
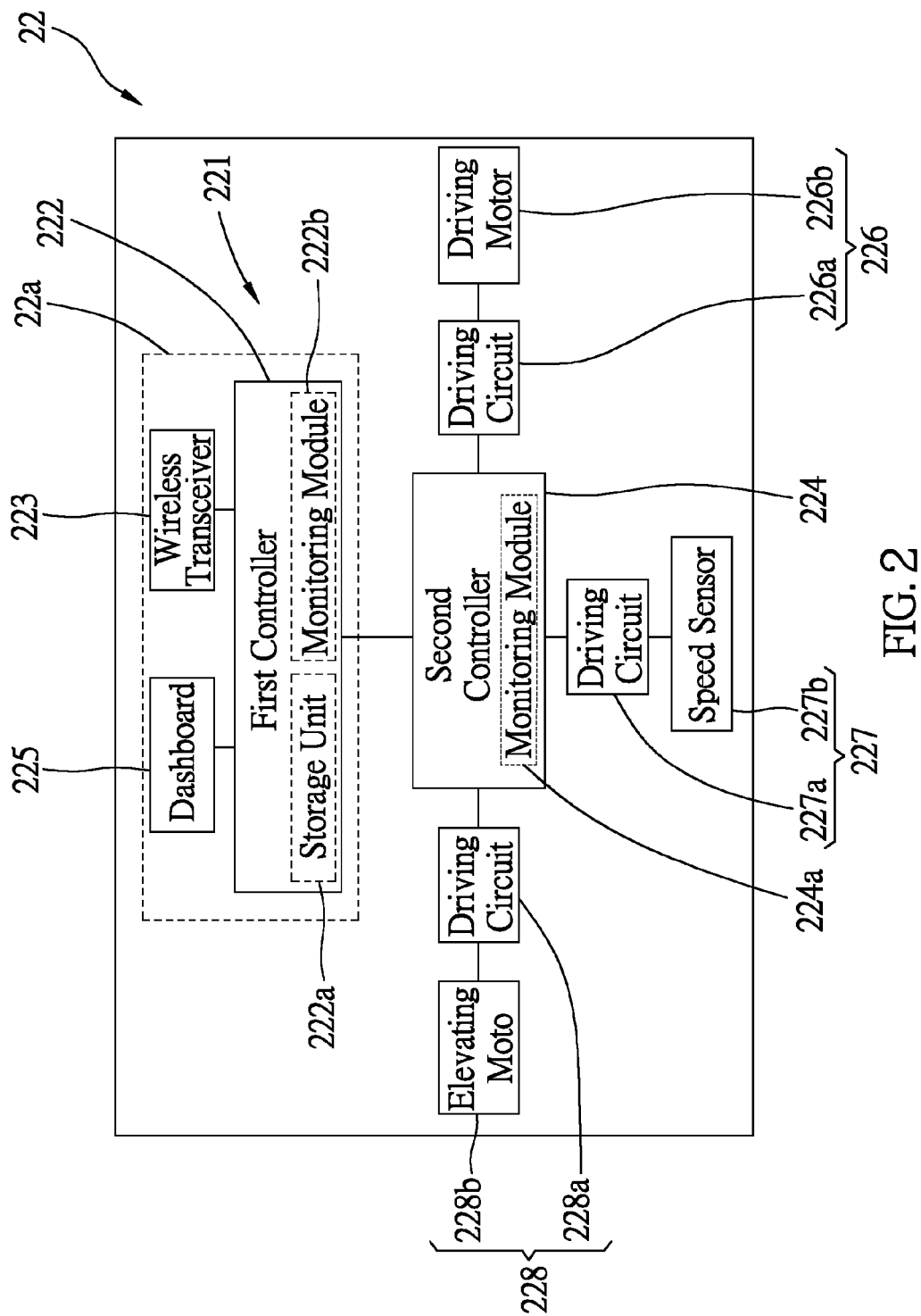
FIG. 2 is a block diagram of the treadmill of the first preferred embodiment of the present invention.

As shown in FIG. 1, a testing system 1 for remotely testing exercise machines includes a control signal source, which is a server 10, and a plurality of exercise machines 20. In the present embodiment, the testing system is applied in a gym.

The server 10 is a remote control device, including a host 12 and a display unit 14. The host 12 is wirelessly connected to the exercise machines 20 through Wi-Fi signals. Any wireless communication technique may be incorporated in the present invention, such as Bluetooth and RF (radio frequency). A monitoring program is executed in the host 12, and the monitoring program is saved with identifying data of each exercise machine 20. The monitoring program generates an acquiring command and a plurality of testing commands. When the exercise machines 20 receive the acquiring command from the host, a current status (including abnormal code) of each exercise machine 20 will be obtained, and the exercise machines 20 will be tested after receiving the testing commands. The display unit 14 shows information from the host 12.

The exercise machines 20 are treadmill 22, bike 24, and elliptical trainer 26 in the present embodiment. However, other kinds of exercise machines, such as rowing machines, could be included as well. We'll take the treadmill 22 for example hereafter to describe the details of the exercise machines 20.

The treadmill 22 has a control unit 221 and a plurality of driving units 226-228. The control unit 221 has a first controller 222, a wireless transceiver 223, and a second controller 224. The first controller 222 and the wireless transceiver 223 are received in a control panel 22a of the treadmill 22. The first controller 222 is electrically connected to the wireless transceiver 223 and the second controller 224. The first controller 222 is communicated with the host 12 of the server 10 through the wireless transceiver 223. The control panel 22a is provided with a dashboard 225, which is connected to the first controller 222, for user to input some setting parameters, such as speed, time, etc., into the first controller 222, and it further shows information from the first controller 222.

Each driving unit 226-228 has a plurality of driving circuits 226a-228a and a plurality of electric devices. The driving circuits 226a-228a are electrically connected to the electric devices respectively. In the present embodiment, the electric devices include a driving motor 226b, a speed sensor 227b, and an elevating motor 228b. The control unit 221 controls the electric devices 226b-228b through the driving circuits 226a-228a, in which the driving motor 226b drives a running belt (not shown) of the treadmill 22, the speed sensor 227b senses a speed of the running belt, and the elevating motor 228b lifts or lowers an end of a belt deck (not shown). The electric devices are common devices in conventional exercise machines, so we are not going to describe the details here.

The first controller 222 receives signals from the server 10, and then transmits the signals to the second controller 224; the second controller 224 controls the electric devices 226b-228b accordingly. The first controller 222 has a storage unit 222a and a monitoring module 222b. The storage unit 222a is saved with an identifying data and a plurality of testing procedures. The identifying data includes a model of treadmill, a series number of manufacturing, and an IP address. Each testing procedure respectively relates to each of the testing commands to test the first controller 222, the second controller 224, or one of the driving units 226-228. The first controller 222 further executes the testing procedure corresponding to the testing command it receives to test one specific driving unit 226-228. The monitoring module 222b monitors the first controller 222 to check if it transmits the signals to the second controller 224 or not. Another monitoring module 224a is provided to monitors the second controller 224 to check if it transmits the signals to the driving circuits 226a-228a or not. Besides, the first controller 222 generates an error code if any driving unit 226-228 or any driving circuit 226a-228a malfunctions. For example, if the running belt of the treadmill 22 malfunctions, the first controller 222 generates the error code indicating the driving unit 226; if the elevation of the belt deck malfunctions, the first controller 222 generates the error code indicating the driving unit 227; if the speed of the running belt is abnormal, the first controller 222 generates the error code indicating the driving unit 228; and if the dashboard 225 malfunctions, the first controller 222 generates the error code indicating the dashboard 225.

Figure 3:
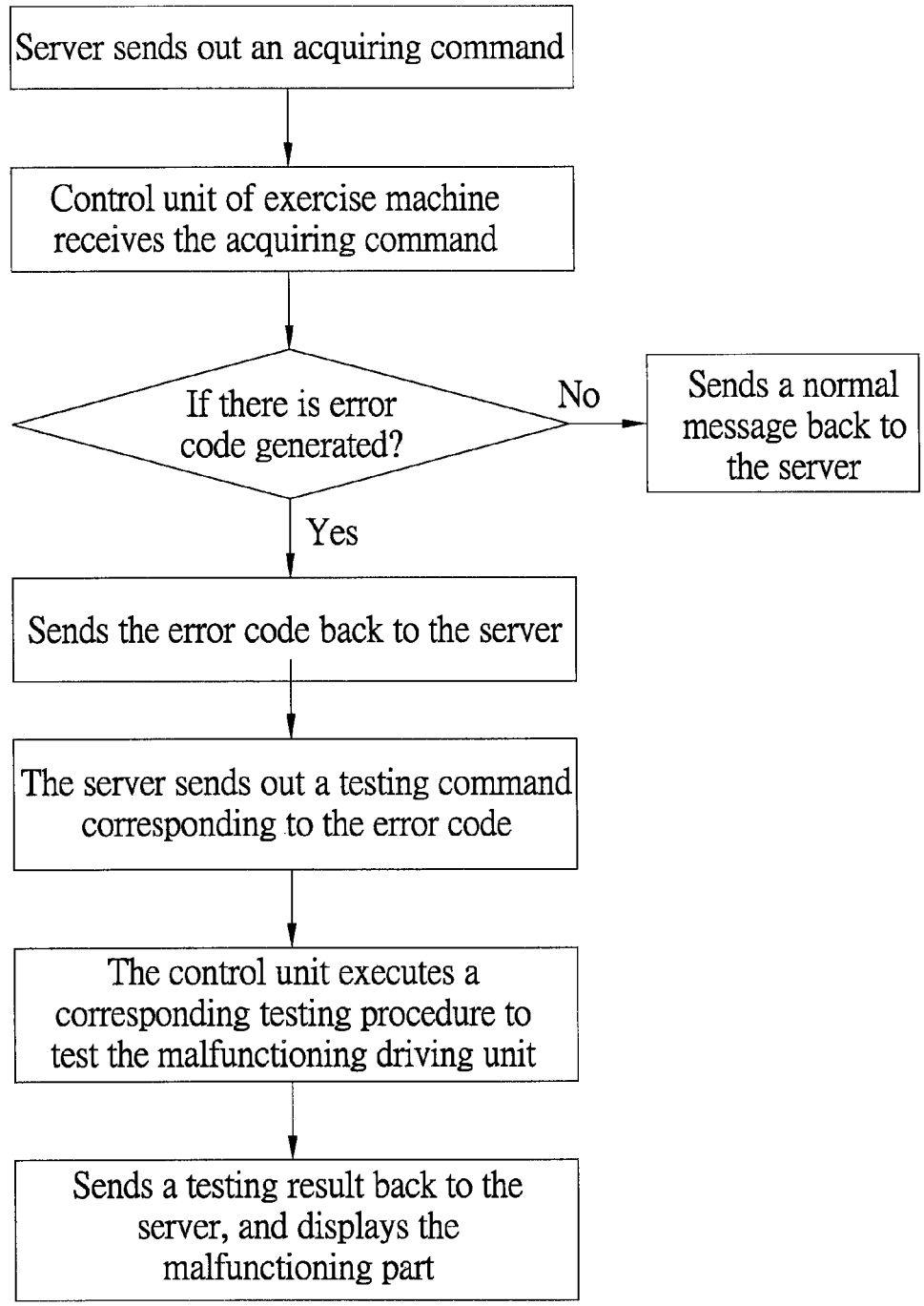
FIG. 3 is a flow chart of the testing method of the first preferred embodiment of the present invention.

FIG. 3 shows a method of remotely testing the exercise machines 20 with the testing system 1 as described above, which includes the following steps:

The monitoring program of the server 10 automatically generates an acquiring command, and transmits it to the exercised machines 20. Take the treadmill 22 for example, the wireless transceiver 223 receives the acquiring command, and then transmits it to the first controller 222. If no malfunction if found (the first controller 222 does not generate any error code), the first controller 222 generates a normal message, and then transmits the normal message as along with the identifying data of the treadmill 22 back to the server 10 to report that the treadmill 22 is working normally. If a malfunction is found, the first controller 222 generates an error code indicating this malfunction, and then transmits the error code as along with the identifying data of the treadmill 22 back to the server 10. At this time, the monitoring program records that the treadmill 22 malfunctions. If the monitoring program sends the acquiring command to one of the exercise machines 20, and no signals is sent back from the exercise machine 20 in a predetermined period, which means that the communication between the server 10 and the exercise machine 20 is failed, the server 10 shows a connection error message on the display unit 14.

When the server 10 receives the error code, the monitoring program generates at least one of the testing commands according to the error code, and then transmits the testing command(s) as along with the identifying data of the exercise machine 20 to control unit 221 of the exercise machines 20. The control unit 221 of each exercise machine 20 checks the identifying data, and executes the testing procedure which corresponds to the testing command(s) if the identifying code matches its identity.

For example, if the treadmill 22 has a jammed running belt, it generates the corresponding error code, and transmits it to the server 10. With the error code, the server 10 generates four testing commands, and transmits them to the treadmill 22. The first testing command is to test if the first controller 222 transmits signals to the second controller 224 or not.

When the wireless transceiver 223 in the control panel 22a receives the first testing command, the first testing command is transmitted to the first controller 222, and then the first controller 222 calls the corresponding testing procedure from the storage unit 222a and executes it. In this testing procedure, the first controller 222 generates a testing signal, and transmits it to the second controller 224. If the monitoring module 222b senses that the testing signal is generated successfully, it sends a normal message to the server 10, and if no testing signal is sensed by the monitoring module 222b, it sends an abnormal message to the server 10. In such case, the server 10 records that the first controller 222 of the treadmill 22 malfunctions, and shows related information on the display unit 14. Either the normal message or the abnormal message is defined as a testing result here. The testing procedure corresponding to the first testing command is thus completed.

Then, the server 10 generates the second testing command, and transmit it to the treadmill 22 to check that if the second controller 224 transmits signals to the driving circuit 226a or not. The same as above, the first controller 222 receives the second command through the wireless transceiver 223, and executes the corresponding testing procedure. The second controller 224 is controlled to generate a testing signal, and then sends it to the driving circuit 226a. If the monitoring module 224b senses that the testing signal is generated successfully, it sends a normal message to the server 10, and if no testing signal is sensed by the monitoring module 224b, it sends an abnormal message to the server 10. In such case, the server 10 records that the second controller 224 of the treadmill 22 malfunctions, and shows related information on the display unit 14. The testing procedure corresponding to the second testing command is thus completed.

After the completion of the second testing command, the server 10 generates the third testing command, and transmit it to the treadmill 22 to check if the driving circuit 226a transmits signals or not. The same as above, the first controller 222 receives the third command, and executes the corresponding testing procedure. The second controller 224 is controlled to send a testing signal to the driving circuit 226a. If the driving circuit 226a receives the testing signal, and sends a control signal to the driving motor 22b accordingly, the second controller 224 generates a normal message and send it to the server 10 through the first controller 222, and if the driving circuit 226a does not send the control signal to the driving motor 22b, the second controller 224 sends an abnormal message to the server 10. In such case, the driving circuit 226a is recorded as malfunctioning, and the related information is shown on the display unit 14. The testing procedure corresponding to the third testing command is thus completed.

Following the completion of the third command, the fourth command is to check the driving motor 226b. The same as above, if the driving circuit 226a sends the control signal, but the driving motor 226b does not be turned on accordingly, the server 10 receives an abnormal message indicating that the driving motor 226b malfunctions; and if driving motor 226b is turned on according to the control signal, the server 10 receives a normal message indicating that it is the running belt malfunctioning. The same as above, the testing result is shown on the display unit 14. At this time point, all the testing procedures are completed.

After completing the aforementioned testing procedures, the server 10 may send a message to inform an administrator or repairman which exercise machine 20 has problem and even which part of the exercise machine 20 malfunctions.

Except the running belt, any driving units may take the same strategy to find out where the real problem is. In regard to the dashboard 225 of the control panel 22a, it could also be tested by sending a test signal from the first controller 222. In practice, the monitoring program is set to transmit the acquiring command periodically for regular inspection of the exercise machines 20.

In the first preferred embodiment, the server 10 automatically sends the acquiring command to the exercise machines 20 to see if there is any problem occurred in the exercise machines 20, which could save time and labor cost since it is not necessary to check every exercise machine 20 one by one manually. Besides, it may find out the exact malfunctioning part of any exercise machine 20, so that the maintaining time could be effectively shortened.

Figure 4:
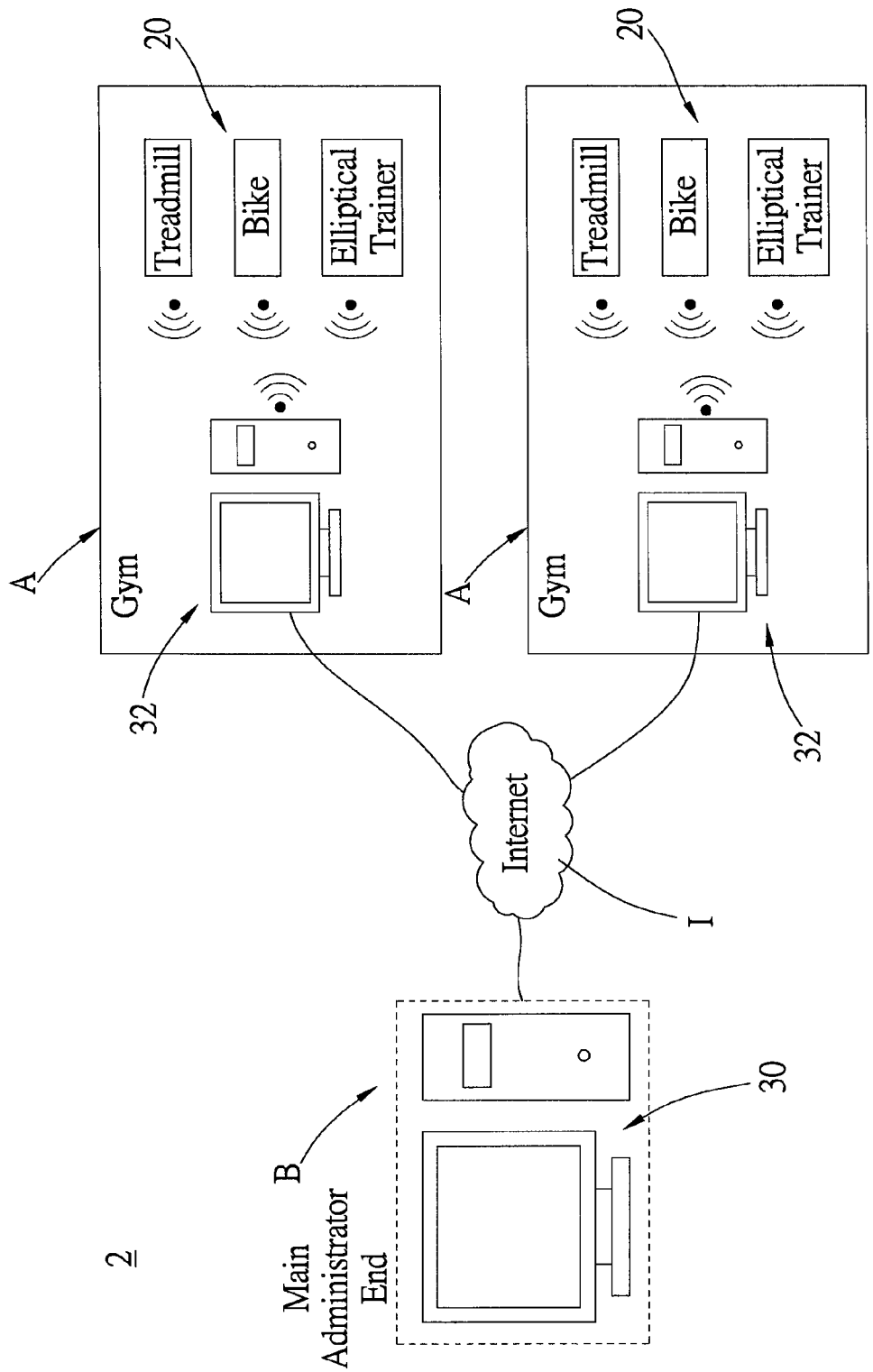
FIG. 4 is a block diagram of the testing system of a second preferred embodiment of the present invention.

FIG. 4 shows a testing system 2 of the second preferred embodiment of the present invention, which is basically the same as the first preferred embodiment, except that the testing system 2 is connected to two gyms A, and each gym A has a plurality of exercise machines 20 to be monitored and tested. A control signal source of the testing system 2 includes a first server 30 and two second servers 32. The first server 30 (the remote control device), which functions the same as the server 10 of the first preferred embodiment, is provided at a main administrator end B (such as the company of selling and/or manufacturing the exercise machines 20) to send the acquiring command and receive the testing results. The second servers 32 are located at the gyms A respectively and communicated with the first server 30 through Internet I. The second servers 32 works as interpreters for the connection between the exercise machines 20 and the first server 30. Each second server 32 has a unique identifying data, and the identifying data includes a code name of the gym A and an IP address thereof.

The same as above, the first server 30 sends an acquiring command and at least a testing command to both or any of the second servers 32, and the second servers 32 transfer them to one of the exercise machines 20. The testing results of the exercise machines 20 are sent to the second servers 32, and then the second servers 32 send the testing results as along with its identifying data to the first server 30.

With the testing system 2 of the second preferred embodiment it may monitor and check the exercise machines of multiple gyms A at the administrator end B to increase the efficiency of maintaining.

In practice, a mobile device (such as tablet) may be incorporated in the present invention to be connected to the first server 30 and the second servers 32. The monitoring program may be executed by the mobile device to perform the monitoring and the testing tasks. This mobile device may be held by an administrator of the gym A and/or a repairman of the main administrator end.

Figure 5:
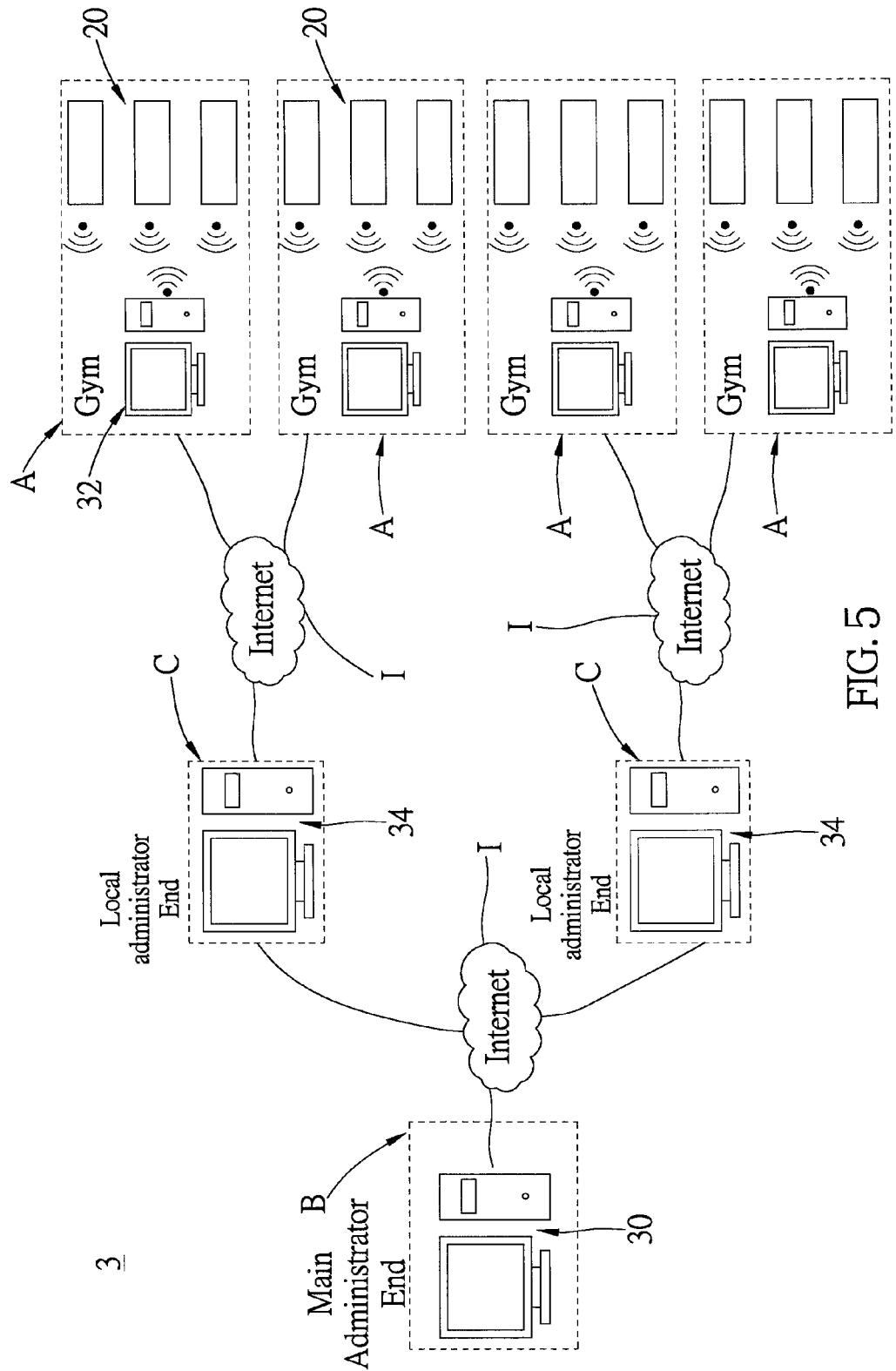
FIG. 5 is a block diagram of the testing system of a third preferred embodiment of the present invention.

FIG. 5 shows a testing system 3 of the third preferred embodiment of the present invention, which basically is the same as the second preferred embodiment, except that it further has two third servers 34. The third servers 34 are connected to the first server 30 at the main administrator end B and the second servers 32 at the gyms A respectively. Each third server 34 is located at a local administrator end C (such as the local dealer of the exercise machines 20) to connect to the gyms A in its dealing area. The third servers 34 also work as interpreters transfer commands and messages.

In practice, the third servers 34 may be used to generate the acquiring command and the testing commands and send them to the corresponding second servers 32, and then send a message to the first server 30 at the main administrator end B only when an abnormal testing result is obtained to share the loading of the first server 30.

In conclusion, the testing system of the present invention starts the monitoring and testing processes to obtain the exact problem of the malfunctioning exercise machine at the main administrator end B to increase the working and maintaining efficiency of the exercise machines 20.

It must be pointed out that the embodiments described above are only some preferred embodiments of the present invention. All equivalent structures and methods which employ the concepts disclosed in this specification and the appended claims should fall within the scope of the present invention.

What is claimed is:

1. A testing system, comprising:
an exercise machine including a control unit and a plurality of driving units electrically connected to the control unit, and the driving units being driven by the control unit, wherein when any one of the driving units malfunctions, the control unit generates an error code specifically corresponding to the malfunctioning driving unit; and
a control signal source connected to the control unit of the exercise machine, wherein the control signal source is saved with a plurality of testing commands, each of which respectively corresponds to each of the error codes generated by the control unit, each of which specifically corresponds to one of the driving units;
wherein when any one of the driving units malfunctions, the control unit generates the corresponding error code; the control signal source sends an acquiring command to the control unit to obtain the error code, and then sends one of the testing commands which corresponds to the error code to the control unit; after receiving the testing command, the control unit tests the driving unit which corresponds to the error code, and sends a testing result back to the control signal source.

2. The testing system of claim 1, wherein the control unit is saved with a plurality of testing procedures, each of which corresponds to each of the driving units and each of the testing commands; the control unit tests the driving units by executing the corresponding testing procedures.

3. The testing system of claim 2, wherein each driving unit has a driving circuit and an electric device to be driven by the driving circuit; after receiving one of the testing commands, the control unit executes a corresponding testing procedure to provide the driving circuit of the corresponding driving unit with a testing signal to drive the electric device thereof; if the electric device works normally, the control unit sends a normal message of the electric device to the control signal source, and if the driving circuit works abnormally, the control unit sends an abnormal message of the electric device to the control signal source, wherein either the normal message or the abnormal message is the testing result.

4. The testing system of claim 2, wherein each driving unit has a driving circuit electrically connected to the control unit; after receiving one of the testing commands, the control unit executes a corresponding testing procedure to provide the driving circuit of the corresponding driving unit with a testing signal to make the driving circuit output a driving signal; if the driving circuit outputs the driving signal, the control unit sends a normal message of the driving circuit to the control signal source, and if the driving circuit does not output the driving signal, the control unit sends an abnormal message of the driving circuit to the control signal source, wherein either the normal message or the abnormal message is the testing result.

5. The testing system of claim 2, wherein after receiving one of the testing commands, the control unit executes a corresponding testing procedure to provide the corresponding driving unit with a testing signal; the control unit has a monitoring module for sensing if the testing signal being provided; if the monitoring module senses the testing signal being provided by the control unit, the control unit sends a normal message of the control unit to the control signal source, and if the monitoring module does not sense the testing signal being provided by the control unit, the control unit sends an abnormal message of the control unit to the control signal source, wherein either the normal message or the abnormal message is the testing result.

6. The testing system of claim 1, wherein the control signal source includes a remote control device and an interpreter; the interpreter is connected to the remote control device and the control unit of the exercise machine respectively; the interpreter and the exercise machine each has an identifying data; the remote control device sends the acquiring command and the testing commands to the interpreter, and the interpreter transfers the acquiring command and the testing commands to the control unit of the exercise machine; the testing result is transmitted from the control unit of the exercise machine to the interpreter, and the interpreter sends the testing result along with the identifying data of the interpreter and the exercise machine to the remote control device.

7. The testing system of claim 1, wherein the control signal source sends the acquiring command periodically.

8. A method of testing at least an exercise machine, wherein the exercise machine has a control unit and a plurality of driving units to be driven by the control unit; when any one of the driving units malfunctions, the control unit generates an error code specifically corresponding to the malfunctioning driving unit; the method comprising the steps of:

A. sending an acquiring command from a remote control device to the control unit of the exercise machine, wherein the remote control device is saved with a plurality of testing commands, each of which respectively corresponds to each of the error codes generated by the control unit, each of which specifically corresponds to one of the driving units;
  B. transmitting the error code generated by the control unit to the remote control device if one of the driving unit is malfunctioning;
  C. sending one of the testing commands which corresponds to the error code from the remote control device to the control unit of the exercise machine; and
  D. testing the driving unit which corresponds to the error code according to the testing command, and then sending a testing result back to the remote control device.

9. The method of claim 8, wherein the control unit of the exercise machine is saved with a plurality of testing procedures, each of which corresponds to each of the driving units and each of the testing commands; in the step D, the driving unit which corresponds to the error code is tested by executing one of the testing procedures corresponding to the testing command.

10. The method of claim 9, wherein each driving unit includes a driving circuit and an electric device; one of the testing procedures includes the steps of transmitting a testing signal from the control unit to the driving circuit of the driving unit, which corresponds to the error code, to drive the electric device thereof; and transmitting a normal message back to the remote control device if the electric device is running normally, or transmitting an abnormal message back to the remote control device if the electric device is running abnormally, wherein either the normal message or the abnormal message is the testing result.

11. The method of claim 9, wherein each driving unit includes a driving circuit electrically connected to the control unit; one of the testing procedures includes the steps of transmitting a testing signal from the control unit to the driving circuit of the driving unit, which corresponds to the error code, to make the driving circuit output a driving signal; and transmitting a normal message back to the remote control device if the driving circuit outputs the driving signal, or transmitting an abnormal message back to the remote control device otherwise, wherein either the normal message or the abnormal message is the testing result.

12. The method of claim 9, wherein one of the testing procedures includes the steps of transmitting a testing signal from the control unit to the driving unit which corresponds to the error code; and transmitting a normal message back to the remote control device if the control unit sends the testing signal, or transmitting an abnormal message back to the remote control device otherwise, wherein either the normal message or the abnormal message is the testing result.

13. The method of claim 9, wherein the acquiring command is sent periodically in the step A.

14. The method of claim 8, wherein the remote control device transmits the acquiring command and the testing commands to an interpreter, and the interpreter transfers the acquiring command and the testing commands to the control unit of the exercise machine; the testing result is sent to the interpreter along with identifying data of the exercise machine and the interpreter, and the interpreter transfers the testing result, the identifying data of the exercise machine and the interpreter to the remote control device.

* * * * *